May 24, 1932.  J. L. NIEMANN  1,860,262

ELECTRODE ELECTRIC WELDING DEVICE

Filed Aug. 5, 1931

Jesse L. Niemann
INVENTOR

BY Victor J. Evans
and Co. ATTORNEY

Patented May 24, 1932

1,860,262

UNITED STATES PATENT OFFICE

JESSE L. NIEMANN, OF COLUMBUS, OHIO

ELECTRODE ELECTRIC WELDING DEVICE

Application filed August 5, 1931. Serial No. 555,355.

This invention relates to an electrode electric welding device and consists in the novel features herein described and claimed.

An object of the invention is to provide an electrode electric welding device, consisting of one main member on which is mounted one movable member, operating over a fulcrum with flanges on both sides thereof and held in place by a pivot thus forming a jaw, easily removable by hand, thus permitting the movable member to be released from the main member, without the use of any tool, should it or the jaw thus formed become foul, worn or damaged. The arrangement allows a used or new movable member to be easily substituted upon said main member whenever necessary. Said movable member at the end gripped by the hand of the operator having a group of three semi-elliptical leaf springs attached thereto by means of two screws. All of said springs are seated upon an elevated block base, the longest thereof bearing upon an insulating plate resting upon the main member, held in place by two small metal studs elevated from said main member and the pressure from said group of semi-elliptical springs, to the end that electric current will not destroy or weaken the tension of said springs.

A further object of the invention is to provide a means for securely and effectively connecting the uninsulated end of a multiple wire extra flexible electric cable to the main member by means of a bore, a threaded bolt, and a nut, so constructed that when said nut is drawn into the bore through an opening by means of the threaded bolt it mashes the uninsulated wire into a mass in the bore and around said nut until said wires become firmly a part of the main member, thus permitting an uninterrupted flow of electricity from the cable through said main member into the electrode held in place upon the main member by the movable member or jaw to the point of welding contact.

A further object of the invention is to provide a separate support to said cable and its connection to said main member and strengthen said electrical connection by firmly attaching all of said cable to said main member, including the insulated portion thereof by binding it into the bore of said main member by means of a cross bar and block held in place by two screws so that in handling the tool the insulated electrical cable will always follow the main member because of this method of attachment. This support to said main member will not permit strain or loosening of the uninsulated wire in the bore of said main member at the point of contact described in the preceding paragraph, so that no interruption of the flow of electric current from cable to main member can occur and on to the electrode and point of welding.

A further object of the invention is to provide means for supporting an insulating sleeve or hand hold upon the main member, where the multiple wire electric cable is attached, for gripping said tool in the hand of the operator in such a manner that the said sleeve or interior of the hand hold is ventilated, thereby providing means for its air cooling, thus shielding the operator from excessive heat when the electrical current is passing from the cable through the main member to which it is attached and to the welding point, or heat from the electrode held in place upon the main member by the removable member or jaw when the device is in operation.

In the accompanying drawings:—

Figure 1:
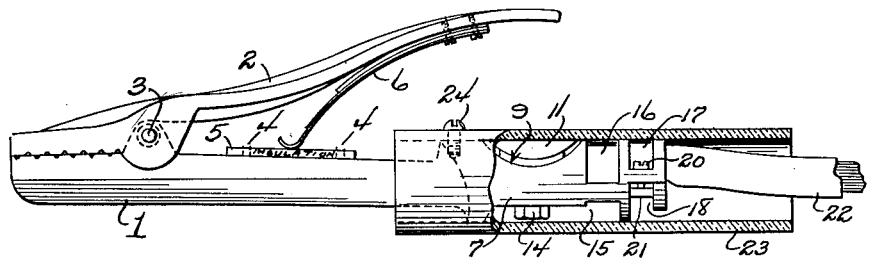
Figure 1 is a side elevational view of the electrode electric welding device with parts broken away and parts shown in sections.
Figure 2:
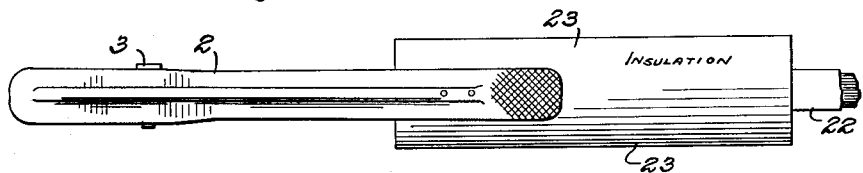
Figure 2 is a top plan view of the electrode electric welding device.
Figure 3:
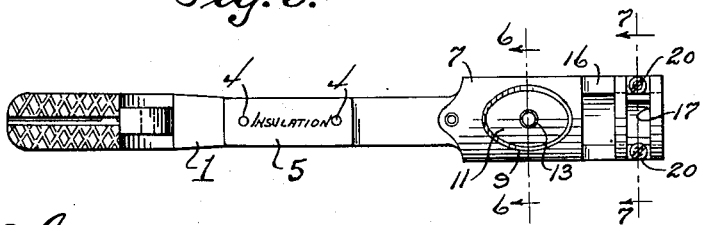
Figure 3 is a top plan view of the main member of the electrode electric welding device and the handle portion thereof.
Figure 4:
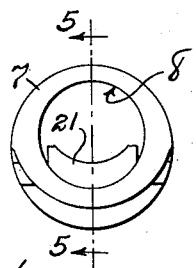
Figure 4 is an end view of the same.

As illustrated in the accompanying drawings, the electrode electric welding device comprises a main member 1 and an upper movable member 2, pivotally connected together by means of a removable pin 3 working over a fulcrum and held in place by flanges, so as to form a jaw for the purpose of holding an electrode and so constructed that the two members may be easily separated when desired. The main member 1 is provided upon its inner side with a pair of upstanding studs 4 upon which is mounted a plate 5 of insulating material. This insulating plate 5 is held in place upon said studs 4 by the tension from a group of semi-elliptical springs attached to said movable member 2. This plate 5 may be easily removed from main member 1 and said studs 4 when pin 3 is withdrawn for the purpose of removing movable member 2.

A group of semi-elliptical leaf springs 6 is attached by two screws to said movable member 2 at the end used for the hand of the operator. It is the inner-most of this group of springs 6 which bears upon plate 5 whereby the free end of movable member 2 is normally held away from main member 1 when the electrode (not shown) is inserted between the ends of these two members which naturally form a jaw for holding said electrode. When releasing the electrode or inserting a new electrode in said jaw spring 6 moves along the upper surface of plate 5 and the insulating plate prevents the electric current from passing through or into springs 6 thus indefinitely prolonging the life and tension of said springs 6.

Figure 5:
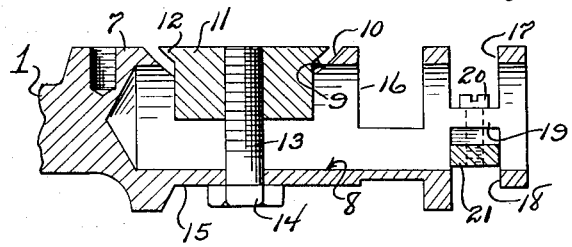
Figure 5 is a fragmentary longitudinal sectional view of the same cut on the line 5—5 of Figure 4.
Figure 6:
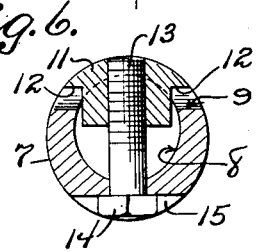
Figure 6 is a transverse sectional view of the same cut on the line 6—6 of Figure 3.
Figure 7:
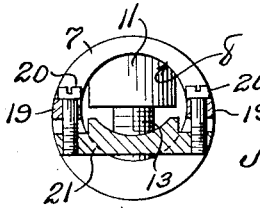
Figure 7 is a transverse sectional view of the same cut on the line 7—7 of Figure 3.

The main member 1 is provided at its outer end with a handle portion 7. Said handle portion 7 having a bore 8 leading into the same from the outer end thereof. The top side of the handle portion 7 is provided with an opening 9 having inclined end walls 10 the said opening communicating with bore 8 as best shown in Figure 5 of the drawings. A nut 11 is adapted to pass through said opening into bore 8 and the said nut is provided at its upper edge with a flange 12 which is adapted to engage upon the inclined surfaces 10 when the nut is tightly drawn into the opening 9 for the purpose of securely fastening the uninsulated electrical cable to the main member. A bolt 13 passes through the lower wall of the portion 7 and has a threaded engagement with the nut 14. The head 14 of the bolt 13 is housed in a recess 15 provided in the lower side of the handle portion 7. The top side of the portion 7 is provided with a recess 16 which communicates with the recess 15 and these recesses form an air chamber which serves as means for preventing excessive heat from being transmitted to the insulating sleeve which is gripped in the hand of the operator and which will be hereinafter described.

The rear portion of the handle 7 is provided at its upper and lower sides with the recesses 17 and 18 respectively, as shown in Figure 5 of the drawings and the parts 19 lying between the recesses, 17 and 18 serve as means for holding screws 20, the lower ends of which are threaded through a plate 21 which is transversely mounted in the recess 18. The heads of the screws 20 are in the recess 17. The bar across the bore in main member 1 is drawn by means of these screws against the wire cable and its insulation, holding it firmly as a part of said main member, thus clamping the cable into the bore of the main member so as to hold both insulation and wire firmly to main member without placing the weight of pulling said cable and handling the tool and loosening the electrical connection of the uninsulated wires to the main member by means of bolt 13 and nut 11, as shown in Figure 5.

The end of the electrical cable 22 is inserted in bore 8 of handle portion 7. The bolt 13 is passed transversely through the uninsulated wires of the cable and is screwed into nut 11 thereby drawing the nut through the opening 9 into bore 8 until the flanges 12 come in contact with the surface 10 of the opening 9, thus completing an electrical connection between the cable and the main member.

The insulation upon the cable and the cable itself 22 passing through the support are gripped firmly against the main member by tightening screws 20 thereby clamping plate 21 and the cable 22 firmly to the main member 1 of the electrode electric welding device. Before inserting the end of the electric cable 22 into the bore 8 a cylindrical sleeve 23 is threaded thereon and after attaching said cable to said main member the sleeve is moved over the portion 7 of the main member 1 to the position as shown in Figure 1 of the drawings. The sleeve 23 is of insulating material and is held in place on the portion 7 by a screw 24 and the sleeve serves as the surface which is grasped by the operator when the tool is taken in his hand and inasmuch as the sleeve is composed of insulating material the operator is protected against current as well as heat from the current by the air tending to circulate through the chambers 15 and 16 passing in and out at either end of the sleeve 23 which is spread from the sides of the cable 22.

Having described the invention what is claimed is:—

1. An electric welding device comprising a main electrode member provided at one end with a bore adapted to receive a cable and the insulation thereof, a nut passing through the wall of said member and entering said bore, a bolt passing through the opposite wall and screwed into the nut, and a clamping plate movably mounted upon said member and adapted to enter the bore thereof and means for drawing said plate in contact with the cable and the insulation thereof.

2. An electric welding device comprising an electrode member having a bore adapted to receive a cable, clamping devices mounted at spaced intervals along the bore, the electrode member having an opening in its wall located between the clamping devices adapted to admit air into the bore, and a handle of insulating material attached to the electrode member and disposed over the clamping devices and said opening.

In testimony whereof I affix my signature.

JESSE L. NIEMANN.